US009636738B2

(12) United States Patent
Andersson

(10) Patent No.: US 9,636,738 B2
(45) Date of Patent: May 2, 2017

(54) METHOD AND A DEVICE FOR THE MANUFACTURING OF WASHERS FOR LOCKING AND WASHER FOR LOCKING

(75) Inventor: Mattias Andersson, Ostersund (SE)

(73) Assignee: Nord-Lock AB, Mattmar (SE)

(*) Notice: Subject to any disclaimer, the term of this patent is extended or adjusted under 35 U.S.C. 154(b) by 1711 days.

(21) Appl. No.: 12/680,000

(22) PCT Filed: Sep. 26, 2008

(86) PCT No.: PCT/SE2008/051081
§ 371 (c)(1),
(2), (4) Date: Mar. 25, 2010

(87) PCT Pub. No.: WO2009/041906
PCT Pub. Date: Apr. 2, 2009

(65) Prior Publication Data
US 2010/0209214 A1 Aug. 19, 2010

(30) Foreign Application Priority Data

Sep. 28, 2007 (SE) ...................... 0702188

(51) Int. Cl.
*B21D 53/22* (2006.01)
*F16B 39/24* (2006.01)
*F16B 43/00* (2006.01)

(52) U.S. Cl.
CPC ............. *B21D 53/22* (2013.01); *F16B 39/24* (2013.01); *F16B 43/00* (2013.01)

(58) Field of Classification Search
USPC ...... 470/41, 42, 162, 163; 72/327, 328, 332, 72/333, 335, 336, 353.2, 354.6, 354.8,
(Continued)

(56) References Cited

U.S. PATENT DOCUMENTS 414,109 A * 10/1889 Facer ............................. 72/356
653,084 A * 7/1900 Hart ............................... 470/41
(Continued)

FOREIGN PATENT DOCUMENTS

CN 1256980 A 6/2000
CN 1309592 A 8/2001
(Continued)

OTHER PUBLICATIONS

Chinese Office Action of corresponding Chinese Application No. 200880108846.X, dated Feb. 3, 2012.
(Continued)

*Primary Examiner* — Edward Tolan
(74) *Attorney, Agent, or Firm* — Renner, Otto, Boisselle & Sklar, LLP

(57) ABSTRACT

A method for the manufacturing of circular washers for locking from blanks, a washer having a central hole, a first side comprising a pattern of radially extending teeth and a second side comprising a pattern of radially extending cams. The method is especially comprised in the steps of producing a washer blank having an annular shape; introducing the washer blank into a die assembly for forming a closed shaping space by a lower die portion, an opposing upper die portion, a central die portion and a support piece, the central die portion extending through a washer blank central hole; forming the blank to a washer by mutual movement of said lower and upper die portions; and opening the closed shaping space to extract the formed washer. The invention also relates to a device and a washer.

10 Claims, 3 Drawing Sheets

Figure 1:
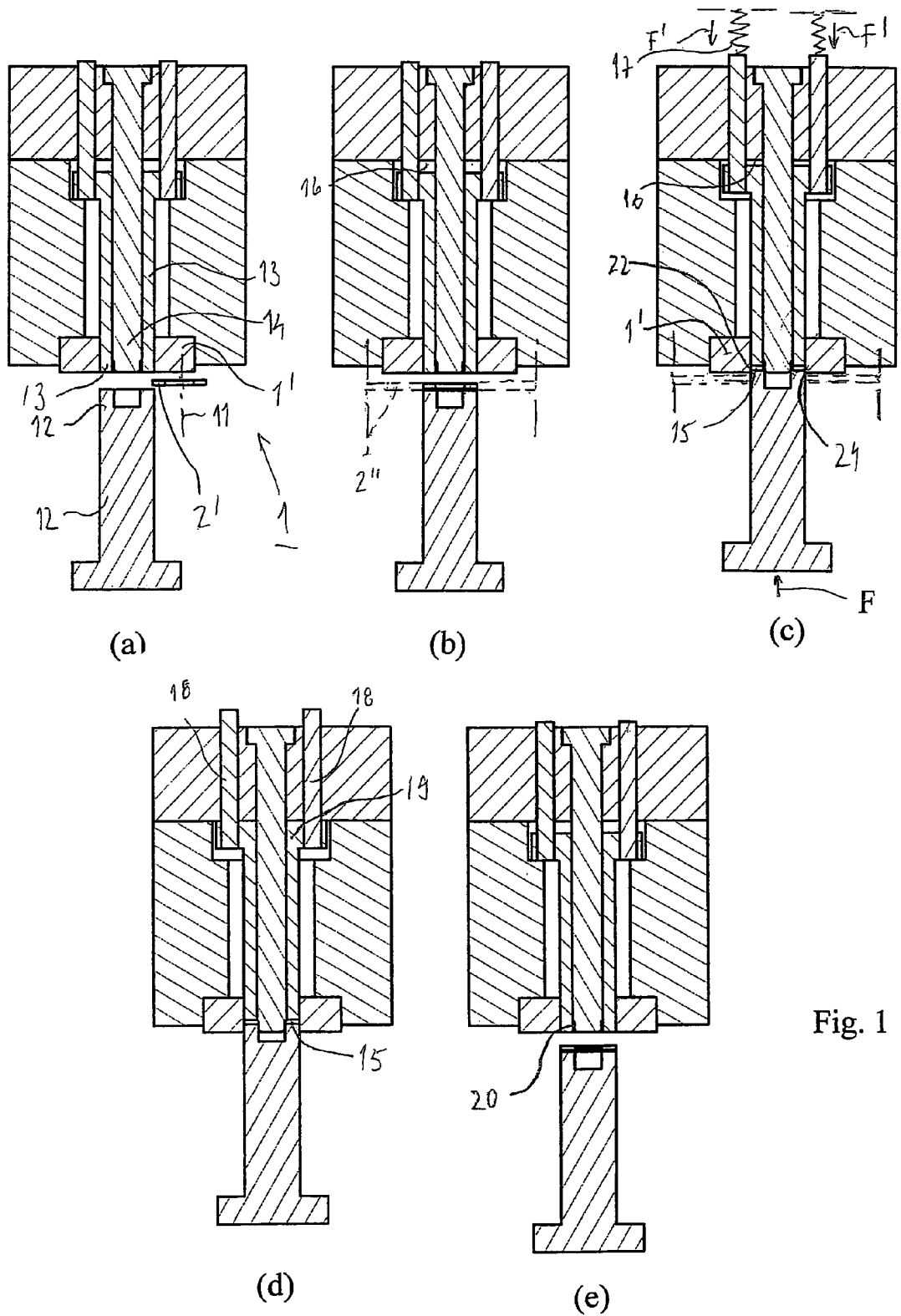

(58) Field of Classification Search
USPC .................................................... 72/355.2
See application file for complete search history.

(56) References Cited

U.S. PATENT DOCUMENTS

| | | | | |
|---|---|---|---|---|
| 795,794 | A * | 7/1905 | Gaines | 470/162 |
| 1,381,462 | A | 6/1921 | Hench | |
| 1,560,135 | A * | 11/1925 | Bell | 72/353.2 |
| 1,915,612 | A | 6/1933 | Olson | |
| 1,995,357 | A * | 3/1935 | Liss | 72/328 |
| 2,350,756 | A * | 6/1944 | Heinold | 411/165 |
| 2,636,253 | A * | 4/1953 | Rees | 72/48 |
| 2,747,266 | A * | 5/1956 | Schaming | 72/377 |
| 3,902,209 | A * | 9/1975 | Gohs | 470/42 |
| 4,274,276 | A | 6/1981 | Mettler | |
| 4,590,782 | A | 5/1986 | Leykamm et al. | |
| 4,653,310 | A | 3/1987 | Urata et al. | |
| 5,259,819 | A * | 11/1993 | Lee | 470/41 |
| 6,260,400 | B1 * | 7/2001 | Nishigohri et al. | 72/355.6 |
| 7,191,633 | B1 * | 3/2007 | Uehara et al. | 72/355.4 |
| 7,331,874 | B2 * | 2/2008 | Lin | 470/41 |
| 7,987,691 | B2 * | 8/2011 | Andersson | 72/404 |
| 2008/0009355 | A1 | 1/2008 | Lin | |

FOREIGN PATENT DOCUMENTS

| | | |
|---|---|---|
| CN | 1453097 A | 11/2003 |
| CN | 1562560 A | 1/2005 |
| CN | 1846072 A | 10/2006 |
| DE | 148 016 | 5/1981 |
| EP | 0 755 323 B1 | 1/1997 |
| EP | 1660780 A1 | 5/2006 |
| JP | 63-220941 A | 9/1988 |
| JP | 05-329568 | 12/1993 |
| JP | 06-106279 | 4/1994 |
| JP | 60-91339 A | 4/1994 |
| JP | 10-225737 | 8/1998 |
| JP | 2007-504409 A | 3/2007 |
| JP | 2007-245229 A | 9/2007 |
| WO | 2005/024253 A1 | 3/2005 |
| WO | 2006/130106 | 7/2006 |
| WO | 2006/130106 A1 | 12/2006 |
| WO | WO 2006/130106 A1 | 12/2006 |

OTHER PUBLICATIONS

Second Office Action, State Intelectual Property Office of People's Republic of China, Dec. 10, 2012.
Communication pursuant to Rule 114(2) EPC dated Jun. 26, 2012 in European Patent Application No. 08 833 856.1, together with Observations [by a third party] Under Art. 115 EPC dated Jun. 18, 2012, and attachments thereof, including the listed documents at pp. 1 and 2 of the Observations document; note the listed documents include among them an Affidavit (dated Jun. 18, 2012) of Paolo E. Cattaneo, General Manager of Growermetal s.r.l. and Document D3 to which the Affidavit refers.
First Declaration of Karl Stahl (dated Oct. 16, 2012), concerning a SCHULER-brochure entitled "High-Speed Embossing Press Type EMKH," together with the brochure; and a second Declaration of Karl Stahl (dated Oct. 23, 2012).
Notification from the Japanese Patent Office dated Nov. 13, 2012 communicating the filing of Third Party Observations in Japanese Patent Application No. 1010-526851, together with the Third Party Observations submission by Grabener Pressensysteme.
Office Action in corresponding Japanese application No. 2010-526851 dated Mar. 26, 2013.
English translation of Notice of Final Rejection in corresponding Korean Patent Application No. 10-2010-7006611 dated May 16, 2016.
International Search Report, corresponding to PCT/SE2008/051081, mailed Dec. 8, 2008.
Written Opinion, corresponding to PCT/SE2008/051081, mailed Dec. 8, 2008.
English translation of Notice of Preliminary Rejection in corresponding Korean Patent Application No. 10-2010-7006611 dated Dec. 24, 2014.

* cited by examiner

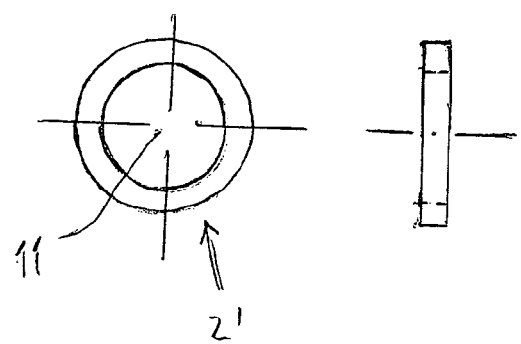
Fig. 2
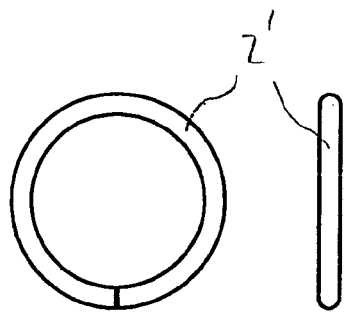
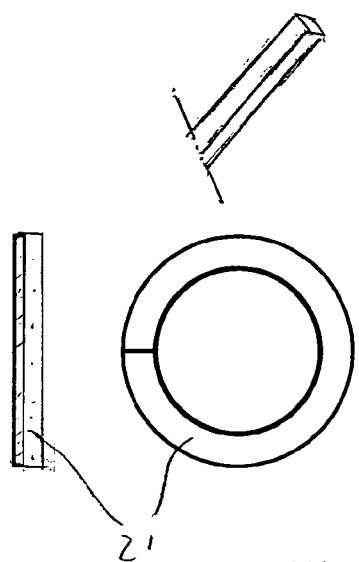
Fig. 3
Fig. 4

(a)

(b)

(c)

(e)

A-A (d)

(f)

METHOD AND A DEVICE FOR THE MANUFACTURING OF WASHERS FOR LOCKING AND WASHER FOR LOCKING

BACKGROUND

The present invention relates to a method for the manufacturing of washers for locking.

The present invention also relates to a device for the manufacturing of washers for locking.

Further, the invention relates to a washer for locking.

PRIOR ART

Washers as described above are previously known and provided for eg bolts or the corresponding fastening elements for locking purposes. In a locking system of this kind two washers are arranged in a pair, substantially as shown in FIG. 1, the cam pattern sides facing and engaging each other, the main cam surface inclination being larger than the pitch of the threads, which causes a positive and efficient locking of the fastening element.

According to what is previously known the washers are manufactured from a strip blank, which is fed to pass several stations, in which forming and/or punching is performed between upper and lower tools, the pattern of teeth being formed on and substantially covering the upper surface and the pattern of cams being formed on and substantially covering the lower surface of the washer.

This known technique is associated with several disadvantages and problems. Thus, there is a possibility that undesired displacements occur between the stations during feeding in the die arrangement, such displacements causing defect washers. Further, the total amount of blank material is quite high. Furthermore, there are restrictions related to the cam and teeth cover on each side of the washers, which decreases the possible load bearing surfaces. Also, the outer periphery is punched out and then receives a sharp edge, which causes problems in the further processing of the washer.

As described in Applicant's Swedish Patent Application No. 0501224-0 the outer periphery of the tooth pattern is deformed during the punching out of the washer. Therefore an edge zone free from pattern is formed, against which the punch rests during punching. This restricts the load transferring surface of the washer.

The object of present invention is to provide a solution to these problems associated with previously known technique.

SUMMARY OF THE INVENTION

The object of the present invention is obtained by a method, a device and a locking washer having the features specified in the claims.

Further advantages are obtained by what is specified in the respective dependent claims.

SHORT DESCRIPTION OF THE DRAWINGS

Figure 5:
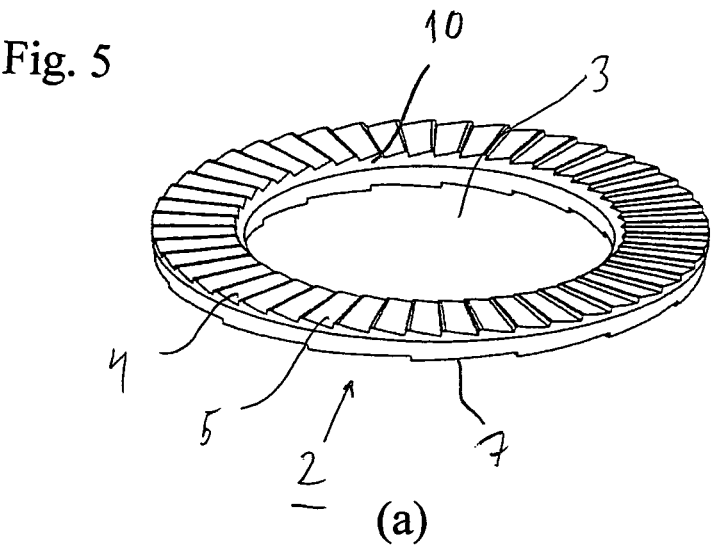
Figure 5:
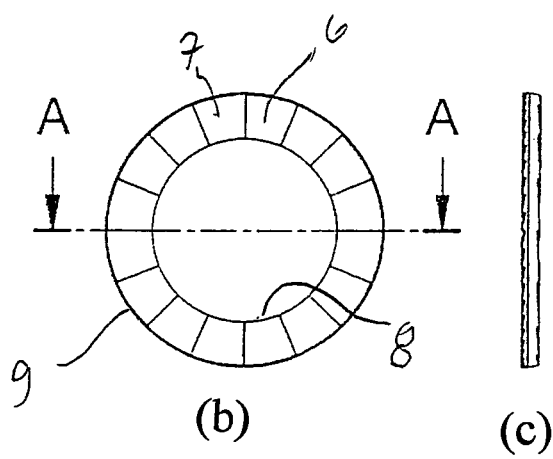
Figure 5:
Figure 5:
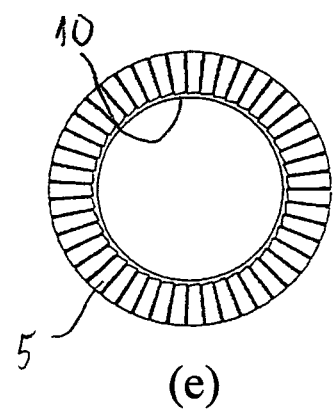
Figure 5:
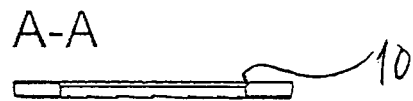
Figure 5:
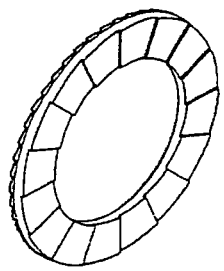

A better understanding of the present invention will be had in view of the following description related to examples and preferred embodiments, when read in conjunction with the drawings, in which FIG. 1(*a*)-(*e*) schematically shows an axial cross-sectional view of a first embodiment of a die assembly according to the present invention in different process steps for forming a washer according to the present invention, FIG. 2 schematically shows a first embodiment of a washer blank cut from a rolled strip, FIG. 3 schematically shows a second embodiments of a washer blank formed from a wire having a circular cross-section, FIG. 4 schematically shows a third embodiment of a washer blank formed from a wire having a square cross-section, FIG. 5(*a*)-(*f*) schematically shows a washer produced according to the invention seen in perspective views, a front and a side view and a cross-sectional view.

DETAILED DESCRIPTION OF PREFERRED EMBODIMENTS

In FIG. 1 a die assembly for the manufacturing of locking washers is designated by 1. In FIG. 5 an example of a washer 2 to be produced according to the invention is shown. These kind of locking washer comprises a central hole 3 for a bolt element to be locked by a washer arrangement and on one side 4 a pattern of radially extending teeth 5 and on the other, the opposite, side 6 a pattern of radially extending cams 7. The washer has an annular configuration and the respective patterns extend from the inner periphery 8 to the outer periphery 9. According to preferred embodiments the washer comprises a bevelled portion 10 at the inner periphery, preferably on the side 4 having the pattern of teeth, the bevelled portion being intended to adapt to a radius portion under the head of a bolt element.

The die assembly preferably has an axi-symmetric configuration coinciding with the axial direction 11 of a washer to be formed.

The die assembly comprises a lower die portion 12, an upper portion 13 and a central portion 14. According to the embodiment shown the central die portion is fixed and the lower die portion and the upper die portion are mutually movable and arranged to form a closed shaping space 15 together with the central die portion and a support piece 1' for providing a circumferentially running outer wall of said space, a washer blank 2', being intended to be formed to a washer in said closed shaping space 15. In FIG. 1(*a*) the die assembly is open to receive a washer blank 2'.

The lower die portion having received said blank, is movable towards the upper die portion, means, represented by an arrow F, being provided for forcing the lower die portion towards the upper die portion for forming said closed shaping space by the die portions by forcing the upper die portion against an end stop 16 with the washer blank material applied in said space 15, the lower die portion being arranged to be further forced towards the upper die portion for forming the washer blank to a washer as shown in FIGS. 1(*c*) and (*d*).

According to a preferred embodiment spring means 17 are provided to provide a spring force F', against which the upper die portion is displaced when forced towards the end stop, said spring force being provided for pushing out the formed washer when unloading the force F exerted by the lower die portion by retracting the lower die portion.

The spring force is acting on the upper die portion by eg rods 18 acting on an upper portion 19 of the upper die portion, as schematically shown in FIG. 1(*d*). Of course another guiding arrangement that the rods 18 may be imagined and for exerting a spring force F'.

According to preferred embodiments the die assembly is configured to form the tooth pattern and the cam pattern to extend from the inner periphery 8 of the washer to the outer periphery 9 of the washer. Preferably, the lower die portion 12 is designed to form the pattern of cams and the upper die portion 13 is designed to form the pattern of teeth.

According to preferred embodiments the die assembly, preferably by a bevelled end portion 20 of the central die portion as shown in FIG. 1(e), is designed to form the washer with a bevelled configuration at the inner periphery to adapt to a radius under the head of a bolt intended to be locked by a washer arrangement, as described earlier, the bevelled configuration preferably being formed on the tooth pattern side 4 of the washer.

According to one embodiment the blank 2' to be formed is cut from a metal strip 2". Such a blank is schematically shown in FIG. 1(b).

According to another embodiment the blank 2' to be formed in the die assembly is formed from a wire 21 having a circular cross-section, as shown in FIG. 3.

According to a further embodiment the blank 2' to be formed in the die assembly is formed from a wire 21' having a square cross-section, as shown in FIG. 4.

According to a still further embodiment an annular blank 2', as schematically shown in FIG. 1(b)-(c), the die assembly is configured for cutting the blank from a strip 2" in the die assembly prior to forming the blank. In such a case the lower die portion is provided with a circumferentially running edge portion 22 and the die assembly is provided with a support piece 1', which, apart from providing the circumferentially running wall of the closed shaping space, provides a cutting edge 24 for the blank cutting operation, the lower die portion working as a punch in this operation, the operation being schematically shown in FIG. 1(c).

Embodiments may also be imagined according to which a blank in the form of a circular disc, ie without a central hole, is produced, the hole being punched out in the die assembly during forming of the washer, preferably by a central die portion.

In such a case the blank may be punched from a strip or being out, preferably by high velocity cutting, from a wire or a bar or a rod, high velocity cutting being performed with a very small play between the cutting dies and, thus produces a blank with a very accurate disc shape.

The method and function of the device according to the invention as well as the washer according to the invention should to a considerable and sufficient extent have been made clear from the description given above.

For the forming of a washer blank introduced in the die assembly a closed shaping space is formed by a lower die, an upper die, a central die and a support piece. Once the blank is properly introduced the total forming operation for the finished washer is performed in said closed space, which offers a number of advantages, including a proper forming of the two patterns with an extension from the inner periphery to the outer periphery.

In this way one blank or several blanks at the same time is/are formed in one single operation in a closed shaping space, In this way die setting is considerably simplified compared to a process in which a final product is formed in consecutive forming operations linked together by a blank strip, wherein the forming steps depend on each other and require an extremely accurate mutual setting, which requires continuous monitoring and maintenance.

According to preferred embodiments annular washer blanks are punched out/cut out from strips or sheets before being introduced into the die assembly 1. In this way the blanks may be punched out in a closely packed pattern, which saves the amount of blank raw material. These blanks may be fed to the die assembly in any convenient way prior to forming.

Other advantages are eg
very accurate finished product dimensions;
reduced material consumption since less space between the blanks when cut from a strip is necessary;
less raw material storage since the number of band widths may be reduced;
increased process security due to only a small number of settings are necessary;
more efficient use of building area due to smaller press equipment;
lower electrical power level necessary;
smaller number of finished product defects offers higher productivity in glueing operations;
thinner washers having a limited outer diameter may be produced due to accurate blank production.

Above examples and preferred embodiments have be given.

Of course, further embodiments as well as minor changes and additions may be imagined without departing from the basic inventive idea.

Thus, the washers are preferably made of steel, in particular low-alloy steel hardenable to a hardness of about or exceeding 465 HV.

According to preferred embodiments the washers are designed with an outer diameter for the washer to fit in a standard dimension counter bored hole having a flat bottom, the thickness of the washers being down to less than 1 mm, and according to preferred embodiments the die assembly is designed for forming such washers.

Thus, the invention should not be considered limited to the embodiments shown but can be varied within the scope of the attached claims.

The invention claimed is:

1. A method for the manufacturing of circular washers for locking from blanks, a washer having a central hole, a first side comprising a pattern of radially extending teeth and a second side comprising a pattern of radially extending cams, comprising the steps of
producing a washer blank having an annular shape;
introducing the washer blank into a die assembly for forming a closed shaping space by a lower die portion, an opposing upper die portion, a central die portion and a support piece providing a circumferential outer wall of said closed shaping space, the central die portion extending through a washer blank central hole;
forming the blank to a washer, in said closed shaping space, by mutual movement of said lower and upper die portions;
opening the closed shaping space to extract the formed washer.

2. A method according to claim 1, comprising the step of cutting the blank from a thin strip.

3. A method according to claim 1, comprising the step of forming the blank from a wire having a circular cross-section.

4. A method according to claim 1, comprising the step of forming the blank from a wire having a square cross-section.

5. A method according to claim 2, comprising the step of cutting the blank in the die assembly prior to forming the blank.

6. A method according to claim 1, comprising the steps of
introducing the washer blank material between the lower die portion and the upper die portion;
forcing the lower die portion against the upper die portion for forming the closed shaping space by the three die portions and the support piece by forcing the upper die portion, against an end stop with the blank material applied in said space; and forming the blank to a washer by further forcing the lower die portion towards the upper die portion.

7. A method according to claim 6, comprising the steps of forcing the upper die portion towards the end stop against a spring force; and pushing out the formed washer by the upper die portion by said spring force when unloading the force exerted by the lower die portion by retracting the lower die portion.

8. A method according to claim 1, comprising the steps of forming the washer with the tooth pattern and the cam pattern extending from the inner periphery of the washer to the outer periphery of the washer.

9. A method according to claim 1, comprising the step of forming the washer with a bevelled configuration at the inner periphery to adapt to a radius under the head of a bolt intended to be locked by a washer configuration, the bevelled configuration preferably being formed on the tooth pattern side of the washer.

10. A method according to claim 1, comprising the step of forming washers with a thickness of down to less than 1 mm, the washers preferably having a standardized outer diameter.

* * * * *